Patented Aug. 29, 1944

2,357,090

UNITED STATES PATENT OFFICE 2,357,090

PROCESS OF PREPARING A LIGNIN-PHENOL-FORMALDEHYDE RESIN DISPERSION

Gaetano F. D'Alelio, Pittsfield, Mass., assignor to General Electric Company, a corporation of New York No Drawing. Application April 17, 1941,
Serial No. 389,042

2 Claims. (Cl. 260—17.5)

This invention relates to synthetic resinous compositions and to processes of making the same. The invention is especially concerned with potentially reactive resinous compositions comprising lignin. More particularly my invention relates to the preparation of molding resins by suitably reacting a mixture of a phenol and lignin or a derivative thereof with an aldehyde under certain specified conditions to be described in detail hereinafter.

Various investigators heretofore have proposed that low cost molding resins be prepared by reacting lignin with phenolic bodies, aldehydes, or phenol-aldehyde resins. However, so far as I am aware, any saving in cost of the prior art products has been more than offset by the accompanying sacrifice of the plasticity characteristics or curing rates of the molding compositions and the strength and surface finish of the products molded therefrom. Many of the prior compositions could not be extracted hot from the mold. Furthermore, it was necessary to dehydrate the resinous compositions prior to the incorporation of fillers, etc.

It is a principal object of the present invention to provide quick-curing lignin-containing phenolic resins of improved plasticity or flow which can be wet-mixed with fillers, etc. to produce molding compositions suitable for the production of strong molded products of good appearance.

I have found that the above object can be attained by mixing and reacting the various resin components together in a certain specified order and under certain particular conditions.

In the practice of my invention, I form a solution or dispersion of a phenol (or a mixture of phenols) and lignin which is then reacted on the acid side with an aldehyde, specifically formaldehyde, in a ratio of approximately 1 mol of phenol to 0.5-0.95 mol of aldehyde. The acid reaction which preferably is carried out at the reflux temperature of the mixture is continued until a part, ordinarily a major portion, of the aldehyde has reacted. The acid reaction mixture is made alkaline and additional aldehyde is added in such an amount that the ratio of total aldehyde to phenol exceeds 1:1 and is preferably 1.2–1.5 mols of aldehyde to one mol phenol. No advantage is derived by the use of more than this amount of aldehyde. The reaction is continued, again preferably at reflux temperatures, until the major portion of all the aldehyde present has reacted. Preferably an analysis of the mixture at the end of this period should show the presence of about 1.5-4.0% of residual uncondensed aldehyde. A dispersing agent, e. g., natural gums, such as gum acacia, gum ghatti, gum tragacanth, etc., commercial dispersing agents, such as are sold under the trade names of Daxad, Hornkem, etc., esters of natural products, such as starch acetate, etc., is then added, preferably while the mixture is still hot. The resultant dispersion is neutralized to varying degrees, excellent dispersions being obtained when the mixture is neutralized to a pH of about 7.0–8.0. More of the dispersing agent is then introduced, followed by the addition of an aldehyde reactable base such as ammonia or a primary or secondary amine to prevent loss of the aldehyde in the subsequent processing operations.

It is not necessary to dehydrate the potentially reactive liquid resin prior to its incorporation with a filler. Preferably the liquid resin varnish so obtained is wet-mixed directly with a fibrous or other filler material, lubricants, dyes, pigments, etc., in varying proportions to form mixtures more easily and cheaply dehydrated than are the original liquid resins. The dried material may then be processed by any of the known methods to produce excellent heat-hardenable moldable material. Molding compositions of my invention may suitably comprise the following ingredients:

| | Parts |
|---|---|
| Resin varnish solids | 30–70 |
| Fibrous filler (wood flour) | 30–70 |
| Lubricant (zinc stearate) | 0–10 |
| Dye (nigrosine) | 0– 5 |
| Base (lime) | 0–10 |

The mechanical strength of a lignin-containing phenolic resin molding composition prepared in accordance with my invention and containing up to 35 per cent lignin in the resin equals that of comparable straight phenol-aldehyde molding compositions. Even larger amounts of lignin may be incorporated in accordance with my invention to obtain products correspondingly stronger than the lignin-phenol-aldehyde compositions of the prior art.

In order that those skilled in the art better may understand how the present invention may be carried into effect, the following specific examples thereof are given. All of the proportions are given in parts by weight.

EXAMPLE I

Resin varnish preparation

One hundred and forty-one parts (approximately 1.45 mols) of an 82 per cent phenol, a commercial product containing about 82-84 per cent phenol, 3 to 4 per cent ortho cresol and 12-15% of a mixture of meta and para cresols and xylenols and 164 parts (approximately 1.51 mols) of No. 8 cresol containing about 4.5% phenol, 2–4 per cent ortho-cresol, 28–31% para-cresol, and 42–47 per cent meta cresol were mixed in a reaction vessel equipped with a stirrer and a condenser and heated to about 40° to 50° C. Sixty-one parts lignin were added to the heated mixture and readily dissolved therein. To this solution were added 121 parts (1.5 mols) of a 37.2 per cent formaldehyde solution and 5.75 parts of a 12.25 per cent sulphuric acid solution. The pH of this mixture was 3.25. The acid mixture was heated to reflux temperatures for 15 minutes at the end of which time 25 parts of a 20 per cent solution of sodium hydroxide and an additional 194 parts (2.4 mols) of a 37.2 per cent formaldehyde solution were added. This alkaline reaction mixture having a pH of about 8.7 was heated to reflux temperatures for an additional 30 minutes to produce a resinous composition containing 2.15 per cent free formaldehyde. A dispersing agent in the form of 195 parts of a 20 per cent acacia solution was added to this composition followed by the slow addition of sufficient sulphuric acid to substantially neutralize the mixture. In this instance 10 parts of 12.25 per cent sulphuric acid solution lowered the pH to 8.35. Another 19.5 parts of the 20 per cent acacia solution were added followed by the gradual addition of 26 parts of a 28.5 per cent ammonium hydroxide solution calculated as necessary to react with the free formaldehyde. The final product was a water varnish containing 56 per cent resin solids curing in 70 seconds on a 150° C. hot plate.

*Compound preparation*

| | Parts |
|---|---|
| Resin varnish solids | 168.0 |
| Wood flour | 308.0 |
| Zinc stearate | 3.3 |
| Lime | 6.6 |
| Nigrosine | 11.9 |

In this and subsequent examples of compound preparation, enough of the resin varnish or dispersion was used to provide the specified parts by weight of resin varnish solids. The resin varnish and fillers, etc., were well mixed by hand and rubbed through a screen to insure uniform distribution of the resin and dye. The mixture was dried at 70° to 75° C. for two and one-half hours in a hot air oven. To advance the resin, the dried material was sheeted for thirty seconds on closely spaced differential rolls with the back roll cooled with water and the front roll heated with thirty lbs. per square inch steam. The sheet was ground and screened through a sixteen mesh screen. The resulting composition cured to an insoluble, infusible state in a mold under approximately 2000#/sq. in. pressure in about one minute at 175° to 180° C. The molded articles had good surface finish and exhibited a dielectric strength of 72 volts per mil when tested in oil at 100° C. The water absorption in boiling water of a quadrant of a molded four inch circular disk cured for two minutes was 1.97 per cent.

EXAMPLE II

*Resin varnish preparation*

| | Parts | |
|---|---|---|
| 82% phenol (3-4% ortho cresol) | 161.00 | (1.65 mols) |
| No. 8 cresol | 189.00 | (1.75 mols) |
| Lignin | 70.00 | |
| No. 1 formaldehyde (37.2% solution) | 138.00 | (1.71 mols) |
| No. 1 sulphuric acid | 1.43 | |

The phenol and cresol were run into a jacketed reaction tank equipped with a stirrer, condenser and thermocouple and warmed to 40° to 50° C. The lignin was added with agitation and when solution thereof was obtained, the formaldehyde and sulphuric acid were added at a temperature of about 50° C. The temperature of the reaction mixture was raised to boiling which occurred at approximately 88° C. Reflux was continued for 15 minutes and stopped by passing cold water through the jacket of the kettle. After the reaction had ceased, 5.7 parts by weight of sodium hydroxide dissolved in 20 parts water and 222 parts (2.75 mols) of a 37.2 per cent solution of formaldehyde were added to the reaction mixture which was again heated to reflux temperatures for 25 minutes. At the end of this time the reaction was again stopped by passing cold water through the jacket of the kettle and 20.6 parts of a 20 per cent solution of acacia were added to the warm mixture which was thereafter neutralized by the slow addition of 3.5 parts sulphuric acid dissolved in 25 parts water. An additional 20.6 parts of a 20 per cent acacia solution were then added followed by the addition of 29 parts of a 28.5 per cent ammonia solution. This amount of ammonia was calculated as necessary to convert all of the residual formaldehyde to hexamethylenetetramine. The resultant dispersion contained no free formaldehyde, and was quite heavy, uniform and very stable. It contained 50 per cent resin solids and cured in 130 seconds when worked on a 150° C. hot plate.

*Molding compound preparation*

| | Parts |
|---|---|
| Resin solids (78 parts of dispersion) | 39.00 |
| Wood flour | 30.00 |
| Cocoanut flour | 20.00 |
| Asbestos floats | 7.00 |
| Nigrosine | 2.00 |
| Dutrex (a commercial dispersing agent) | 0.85 |
| Lime | 1.15 |

The fillers, etc., which had been premixed, were placed in a continuous mixer and the resin varnish was added thereto. When sufficient mixing had produced a homogeneous blend, the mixture was dried and processed for 40 seconds in a Banbury mixer maintained at 100° C. to advance the resin.

The resultant material cured to an infusible state in 50 seconds at a mold temperature of 175° to 180° C. at 2000#/sq. in. pressure.

EXAMPLE III

| | Parts | |
|---|---|---|
| 82% phenol (3-4% ortho cresol) | 161.00 | (1.65 mols) |
| No. 8 cresol | 189.00 | (1.75 mols) |
| Lignin | 70.00 | |
| No. 1 formaldehyde (37.2% solution) | 138.00 | (1.71 mols) |
| No. 1 sulphuric acid | 1.63 | |

These materials were heated and mixed following the same procedure as described under the previous examples. After an acid reaction period of 15 minutes, 4.25 parts sodium hydroxide dissolved in 20 parts of water were added along with 222 parts (2.75 mols) of a 37.2 per cent formaldehyde solution and the mass again heated to reflux temperatures for an alkaline reaction period of about 25 minutes. After 20.6 parts of a 20 per cent acacia solution were mixed into the alkaline reaction product, neutralization thereof by the addition of 3.5 parts of sulphuric acid dissolved in 25 parts water gave a product a pH of 4.6. The addition of another 20.6 parts acacia solution and 43 parts of a 28.5 per cent ammonia solution produced a resin dispersion having a pH of 8.3 and a resin solid content of 49.5 per cent. The final product contained no free formaldehyde and was a somewhat heavier resin varnish than that prepared in accordance with Example II.

*Molding compound preparation*

| | |
|---|---|
| Resin varnish solids (83 parts of dispersion) | 41.00 |
| Wood flour | 33.50 |
| Walnut flour | 13.90 |
| Asbestos floats | 7.50 |
| Nigrosine | 2.00 |
| Zinc stearate | 0.40 |
| Vegetable wax | 0.40 |
| Lime | 1.30 |

The fillers and resin varnish were mixed and dried as under Example II and subsequently processed at 100° C. in a Banbury mixer for 40 seconds.

The appearance of molded products obtained from this mixture was comparable with that of the products prepared in accordance with the previous examples.

Considering the amount of lignin present in the resin varnishes, molded products produced in accordance with this invention possess uniformly excellent physical properties. They ordinarily will show a Charpy impact strength of not less than 0.65 foot pound on the usual A. S. T. M. test bar, a transverse or flexural strength approximating or exceeding 8000 pounds per square inch and a shrinkage of about 9 mils per inch. For example, the impact strength of the products of Example III was 0.7 foot pound, the flexural strength 9,410 pounds per square inch and the shrinkage only 8.7 mils per inch.

It is to be understood that the term "lignin" as used herein is intended to include broadly not only the lignin or lignin bodies obtained from wood but also lignin substances that are obtained from other materials such as by the acid or alkaline hydrolysis of peanut bulbs, corn stalks, straw, etc.

What I claim as new and desire to secure by Letters Patent of the United States is:

1. The process of preparing a dispersion of a potentially reactive resinous composition which comprises forming a solution consisting of lignin dissolved in a phenol, reacting said solution with from 0.5 to 0.95 mol formaldehyde per mol phenol in the presence of an acid catalyst and at reflux temperatures for a period of time sufficient to react a major portion of the formaldehyde, adding sufficient alkali to convert the reaction mixture to an alkaline condition, reacting the alkaline reaction mixture at reflux temperatures with additional formaldehyde in an amount such that the total formaldehyde content of the reaction mixture is in excess of one mol formaldehyde per mol phenol, continuing said alkaline reaction until all but about 1.5 to 4.0 per cent of the formaldehyde has reacted, introducing a dispersing agent into the hot alkaline resinous reaction product, at least partially neutralizing the excess alkali content of said alkaline mixture to a pH of about 7.0 to 8.0, and introducing additional dispersing agent and sufficient ammonia to react with the free aldehyde contained in said neutralized mixture to form a dispersion of the resinous product, the said lignin comprising a substantial proportion, not exceeding 35 per cent by weight, of the resinous reaction product.

2. The process of preparing a dispersion of a potentially reactive resinous composition which comprises forming a solution consisting of about 70 parts lignin in about 350 parts by weight of a phenol, reacting said solution with from 0.5 to 0.95 mol formaldehyde per mol phenol under acid conditions and at reflux temperatures for a period of about 15 minutes, adding sufficient alkali to convert the reaction mixture to alkaline condition, reacting the alkaline reaction mixture with additional formaldehyde in such proportions that the ratio of the total aldehyde content of the reaction mixture to the phenol content thereof is greater than 1:1 and less than 1.5:1, continuing the alkaline reaction under reflux conditions until all but about 1.5 to 4 per cent of the total formaldehyde has reacted, introducing a dispersing agent into the hot alkaline resinous reaction product, at least partially neutralizing the excess alkali content of said alkaline mixture to a pH of about 7.0 to 8.0, and introducing additional dispersing agent and sufficient ammonia to react with the free aldehyde contained in said neutralized mixture to form a dispersion of the resinous product.

GAETANO F. D'ALELIO.